Jan. 23, 1962 L. P. ENTIN 3,017,775
OSCILLATORY INERTIAL REFERENCE
Filed March 27, 1958 3 Sheets-Sheet 1

INVENTOR.
LEONARD P. ENTIN
BY
*Joseph E. Ryan*
ATTORNEY

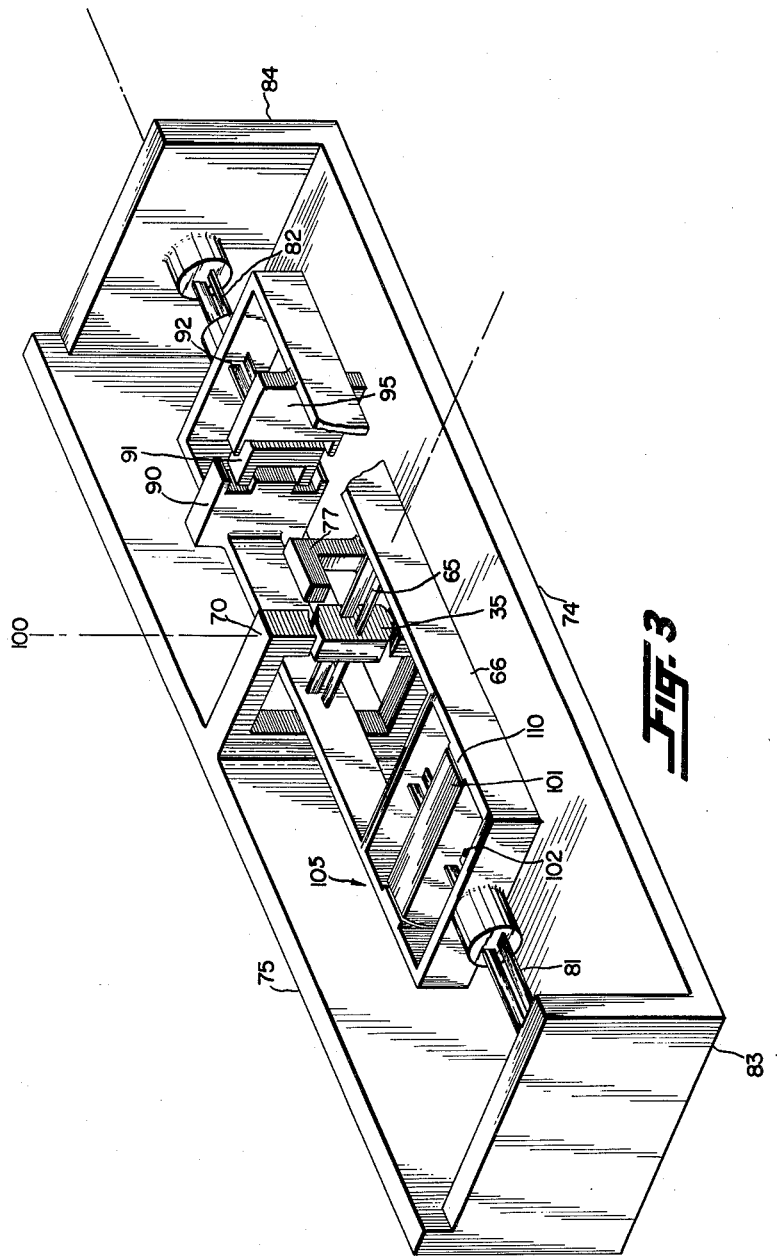

United States Patent Office 3,017,775
Patented Jan. 23, 1962

3,017,775
OSCILLATORY INERTIAL REFERENCE
Leonard P. Entin, Wayland, Mass., assignor to Minneapolis-Honeywell Regulator Company, Minneapolis, Minn., a corporation of Delaware
Filed Mar. 27, 1958, Ser. No. 724,301
14 Claims. (Cl. 73—505)

My invention relates to an oscillating inertial reference and more particularly to an improved type of oscillating inertial reference particularly adapted for the use for measurement of rate of turn or angular velocity imparted thereto.

Inertial apparatus for turn rate measurement or angular velocity measurement is generally old and the most common type of apparatus for performing this function is the spinning rotor type gyroscope. Rotating parts for an apparatus of this type give rise to mechanical difficulties due to frictions, balance and the like, which necessitate complexity in design, high maintenance costs and limited operational life. Attempts to eliminate the necessity of rotating parts has given rise to the tuning fork type gyrosope in which sinusoidal linear velocities are imparted to opposed masses which generally comprise the tines of the tuning fork. This approach to an inertial reference design has necessitated complex and to date unsatisfactory arrangements for measuring resultant precession of the mass to obtain signal outputs therefrom. Most arrangements base their operation on the momentum conservation laws. The present invention is directed to a somewhat similar device in which a mass is constrained through a resilient type support and is caused to oscillate about an axis with the support journalled or similarly constrained to move in response to turning movements applied normal thereto. The last constraint axis permits precession according to the well known principles and the precession movement produces an output through a transducer associated therewith.

It is therefore an object of this invention to provide an improved oscillating type inertial reference particularly designed for angular velocity or rate of turn measurement.

It is further an object of this invention to provide an improved inertial reference of the inertial angular velocity type which permits the simplified torque measuring apparatus.

Another object of this invention is to provide a simplified oscillating type inertial reference for rate measurement purposes which does not utilize any rotating parts and yet presents a conventional mounting configuration to simplify balancing and the minimizing of coupling of torques therein.

Figure 1:
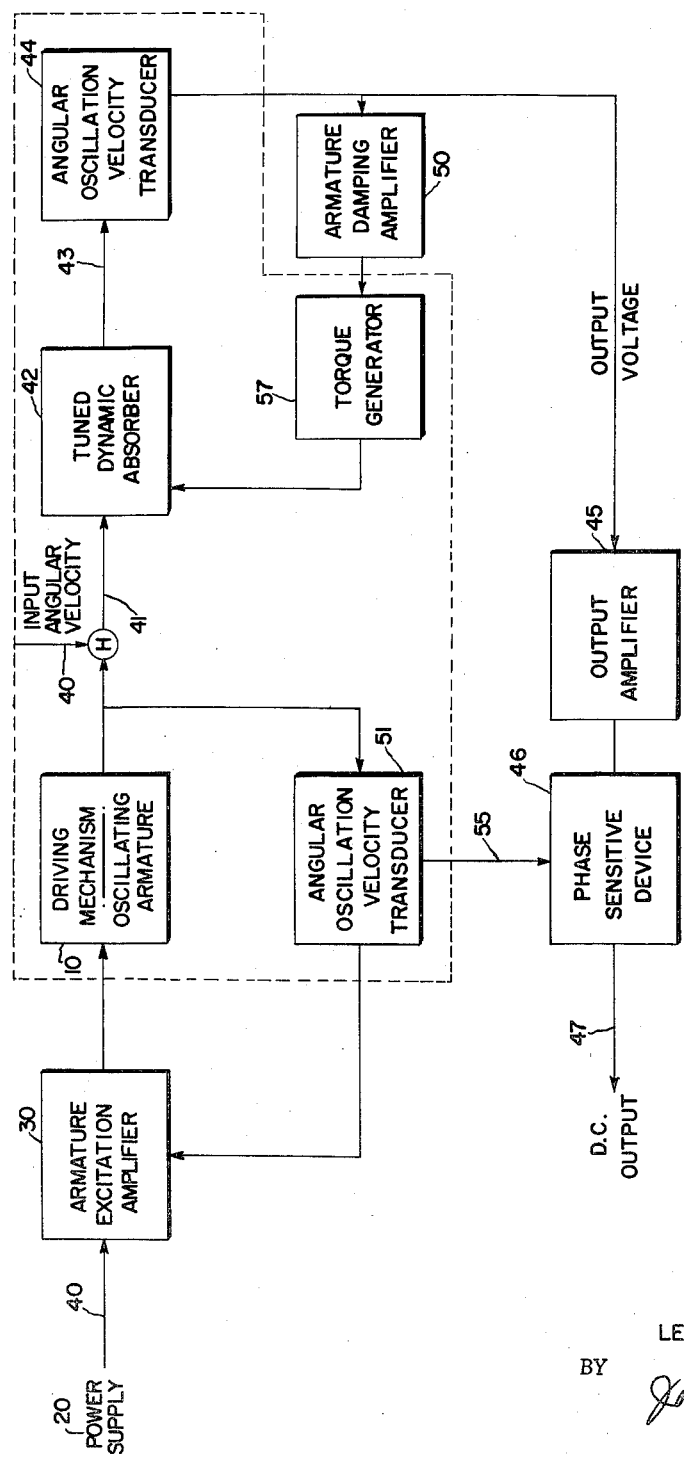
Figure 2:
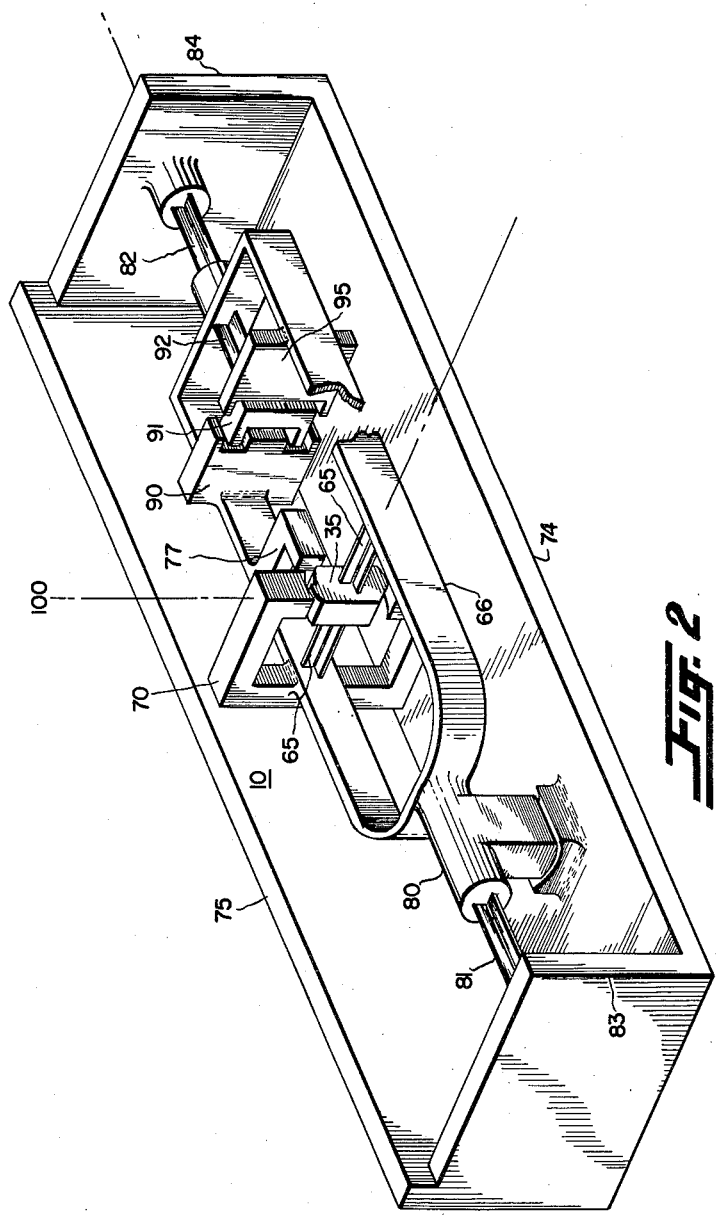

These and other objects of this invention will become apparent from the attached description together with the drawings wherein:

FIGURE 1 is a schematic diagrammatic view of the apparatus in block form together with associated apparatus for angular velocity measurement, FIGURE 2 is a perspective view schematically showing the arrangement of parts of my improved oscillating inertial reference, and FIGURE 3 is another embodiment of the oscillating inertial reference.

The diagrammatic disclosure of the various parts of my improved oscillating inertial reference for angular velocity measurement as shown in FIGURE 1 is included herein for simplification purposes. The driving mechanism for the mass shown generally at 10 is energized from a power supply indicated at 20 through an amplifier 30 which power supply and amplifier are normally not included as part of the reference apparatus but merely as associated therewith and may be of any conventional form. The amplifier 30 would normally supply a reversible current to the driving mechanism 10 to oscillate the mass shown specifically in FIGURE 2 as an armature at 35 to provide a sinusoidal angular momentum to the mass. This armature oscillation through a support means structure will supply momentum H against which the input angular velocity is applied as indicated by the vector 40 to produce a torque output indicated by the vector 41 through a torque absorber indicated at 42 to produce an output oscillation indicated by the arrow 43 acting on an angular velocity transducer indicated generally at 44 whose output is fed to an output amplifier 45 and a phase sensitive demodulator 46 to produce a D.C. output signal indicated at 47. The velocity transducer output is fed through a damping amplifier 50 to a torque generator 57 and acting on the torque absorber 42 as will become apparent from a further description in connection with FIGURE 2. Oscillation of the mass is also sensed by an angular velocity transducer indicated at 51 whose output is coupled with the excitation amplifier for controlling energization of the driving mechanism 10 and also is used as a reference signal as indicated by the vector 55 in connection with the phase sensitive demodulator 46 to provide the right polarity D.C. output in proportion to the direction of the input angular velocity or turning rate.

Referring now specifically to FIGURE 2 it will be seen that the mass 35 is mounted through a constraint or torsion member 65, which may take the form of a plurality of reed springs arranged in a cruciform and known as a "quadrilever," on a gimbal structure indicated at 66 which is generally conventional in form. The mass or armature 35 is adapted to be oscillated with respect to the gimbal structure 66 and constrained through the shaft 65 which provides an arrangement for journalling the armature for limited oscillation without the necessitating bearings or operating parts. The mass or armature 35 is driven through a driving mechanism indicated generally as a C-shaped electromagnet at 10 which is shown as including a magnetic structure 70 shown schematically herein and mounted on the gimbal 66. The magnetic structure could, however, be mounted on a wall portion 75 of a base member 74 to promote design simplicity. In this disclosure windings are omitted but it will be understood that the driving mechanism of the electromagnetic type would incorporate windings on the core structure 70.

The gimbal structure 66 also includes a second core member indicated generally at 77 which would have a sensing apparatus or winding associated therewith and positioned adjacent the armature yet out of contact with the same during oscillation to sense the oscillation of the armature and form a part of the transducer 51. The armature would be of a magnetic material and would be associated with the driving member 10 through its core structure 70 to be magnetically coupled with the same and would also when magnetized cooperate with the core structure 77 to produce a signal in the transducer 51 indicative of the oscillation of the armature. In this arrangement only the driven mass 35 or armature together with its tuning structure and the magnetic structure 77 of the angular oscillation velocity transducer are incorporated on the gimbal 66 which is mounted through a damper indicated generally at 80 and a pair of reed springs or restraints 81, 82, connected respectively to a pair of end wall portions 83, 84 integral with the base 74. Resilient means 81 and 82 may be in the form of quadrilevers if desired.

The system shown utilizes an armature system as a torsional tuning fork maintained in oscillation by feedback. It is also possible to drive the armature with an external alternating current source and with the armature tuned closely to the driving frequency of the external alternating current source. This arrangement is not shown and while requiring a very stable frequency source and a constant armature resonant frequency would simplify the mechanical driving details of the mass. Just as the magnetic structure may also be mounted on the base as well as the gimbal structure, so also the velocity transducer 77 may be associated with the base as well as the gimbal 66. The mounting of these on the base (not shown) may tend to cause increased residual null torque but it will promote design simplification and other improved performance.

The damper as will be later noted is shown herein of the viscous friction type. Such a damper may take other forms as will be later noted. The supporting structure or reeds 81, 82 provide for pivotally mounting the gimbal and the structure supports on the upstanding part 83, 84 of the base 74 through an arrangement necessitating no moving parts and which constrains gimbal movement. The natural frequency of the constrained mass 35 is designed to be considerably higher than the natural frequency of the mounting 81, 82 for the gimbal structure which has a relatively low natural frequency and with the ratio between the two being approximately 5.

The gimbal structure 66 also mounts a field element indicated at 90 for the gimbal angular velocity transducer corresponding to trandsucer 44 of FIGURE 1 and which cooperates with an armature or absorber 91 which is mounted on the gimbal through a shaft or restraining spring indicated at 92 and positioned concentric or parallel with the pivotal axis formed by the restrains 81 and 82. Associated with the armature 91 and field element 90 of the gimbal angular velocity transducer is an electromagnetic type damper 95 which is mounted on the gimbal 66, and cooperates with the armature to damp oscillation of the same. While I have shown an electromagnetic damper 95 upon which a winding (not shown) would normally be mounted for torquing purposes, the damper may be of the fluid viscous type or magnetic if desired. The field element 90 for the transducer would normally carry energizing and secondary windings which are omitted here for simplicity in this schematic disclosure. The energizing windings would be energized from a suitable source of electromotive force (not shown) and the secondary windings would have induced therein a voltage indicative of relative movement or motion between the armature 91 and field element 90. The relative motion between field element 90 and armature 91 would be caused by the gimbal 66 precessing in response to an angular input to the entire inertial device about the input axis 100. Due to the oscillatory motion of the armature or mass 35, the gimbal motion or precession in response to a unidirectional input rate will be oscillatory. Since the armature 91 of the gimbal transducer is resiliently mounted, it will lag behind the gimbal (as the gimbal oscillates) and thus cause the relative movement which is to be detected by the winding means associated therewith. It will be understood that the amount of relative motion between the armature 91 and the gimbal 66 is a function of the angular velocity of the gimbal as it oscillates about its axis defined by the supports 81 and 82. While an electromagnetic transducer has been shown herein for sensing precessional oscillation of the gimbal it will be recognized that other methods of output signal measurement may be utilized, such as an optical system (not shown). It may also be possible to eliminate absorber damping by proper isolation of environmental transients and extremely accurate balancing.

As will be seen from the drawing the armature 35 is mounted on torsion springs 65 to the gimbal 66 and is designed to be maintained in controlled angular oscillation at a resonant frequency through a feedback circuit shown in FIGURE 1 by the transducer 51 being connected to the exciting amplifier 30. This arrangement is somewhat similar to the tuning fork drive. The armature thus has imparted thereto a sinusoidal angular momentum. If the base of the instrument is then rotated about the input axis shown herein a 100 normal to both the axis of the pivots 81, 82 and the oscillation axis of the armature defined by the springs 65 at some angular rate then as in conventional gyros according to the principles of conservation of momentum, a sinusoidal torque will act on the gimbal 66 tending to rotate it about the output axis defined by the pivots 81, 82. The transducer formed by the armature 91 and field structure 90 measures this oscillating torque such that the amplitude of the displacement of the armature 91 becomes a measure of the applied turning rate to the inertial device. As in a tuning fork type gyro the torque about the output axis is of a carrier suppressed type wtih modulation amplitude proportional substantially to the input precession rate. The entire gimbal assembly is mounted on the base 74 through torsion spirngs 81, 82 with a system natural frequency, as previously indicated, which is less than the armature natural frequency. I have found, as indicated, that a ratio of one to five is suitable for this purpose. On the gimbal the dynamic vibration absorber is tuned so that its natural frequency equals that of the armature. It may be viscously damped or electromagnetically damped and the absorber or damper oscillates at appreciable amplitudes in response to the sinusoidal torques which accompany input precession and act on the gimbal. Actually the gimbal support 66 will substantially stand still with respect to space and the motion which the damper executes with respect to the gimbal is proportional to the input precession rate. The transducer generates an output votlage proportional to angular velocity of the absorber or damper with respect to the gimbal. As shown in FIGURE 1 this signal may be operated on in any manner and would generally be amplified and demodulated to provide a direct current output signal. The armature motion transducer 51 senses armature motion and provides a phasing refernce for the demodulator, in addition to its function as controlling the armature or mass drive apparatus. The use of the tuned absorber or damper in conjunction with the low frequency gimbal or support suspension rather than directly tuning the entire support or gimbal assembly represents a departure from previous work in connection with tuning fork type gyroscopes and minimizes the sensitivity of the instrument to both steady and sinusoidal angular accelerations imparted to the output axis of the gyroscope. It further permits a simplified structure promoting miniaturization of the apparatus, since solely a relatively small part of the gyroscope will be set in oscillation in response to input turning rates such that torque, damper and other requirements are reduced. The use of the damper mounted on the gimbal prevents any destructive resonance occurring at the support or gimbal structure at the frequency of armature oscillation.

While the gimbal damping referred to above disclosed the damper 80 viscously coupling the gimbal 66 to the base 74, other variations of the damper are feasible. This damper protects the gimbal assembly from destructive oscillations which environmental vibrations might impose, for the special vibrations coinciding with the resonant frequency of the system represented by the gimbal assembly 66 and the support springs 81 and 82. While such damping does affect gyro sensitivity and somewhat the isolation of the absorber 91 for the velocity transducer 90, these factors may be overcome by the use of a tuned dynamic absorber which modifies the direct viscous damping.

As shown in FIGURE 3, the damper may take the form of a viscously damped tuned absorber. In FIGURE 3, the viscous damper for the gimbal is mounted directly on the gimbal as indicated generally at 105 while the magnet portion 70 of driving mechanism 10 and magnet portion 77 of the oscillation sensor 51 are mounted on the base 74. The mass 35 supported through the springs 65 on gimbal 66 and with the velocity transducer 90 and absorber 91 also mounted thereon. The gimbal 66 in this embodiment is again mounted through the leaf spring 81, 82 connected between the base parts 83, 84 and the gimbal respectively. Damping of the gimbal through the viscous damper 105 includes the damping mass 101 mounted through springs 102 connected to cross members on the gimbal 66 with the viscous coupling between the mass and the edges of the gimbal as indicated at 110. The damper inertial would be approximately 1/10 of the gimbal assembly inertia and the damper is tuned so that the resonant frequency of the damper system approximates that of the gimbal and springs. In this embodiment the damper mass or inertia is viscously damped to the gimbal and not the base. Other forms of gimbal damping are feasible in this arrangement such as a friction tuned damper coupled to the gimbal (not shown) and an acceleration damper (not shown) which would eliminate the viscosity or friction coupling between the damper mass and the gimbal which would utilize stops on the member for absorption purposes.

With the present oscillating inertial reference design it is possible to eliminate any rotating parts and provide an inertial reference the output of which can be readily detected without complex transducer and sensing arrangements.

While the present disclosure is shown diagrammatically it should be recognized that changes may be made therein within the scope of the invention and hence I wish to be limited only by the appended claims.

I claim:

1. An inertial rate sensing apparatus comprising, a mass, a support for said mass, torsion spring means mounting said mass on said support means for oscillatory movement relative thereto about a first axis, a base member, driving means mounted in part on said base member for imparting oscillatory movement to said mass relative to said support, torsion means mounting said support on said base for oscillatory movement relative thereto about a second axis normal to said first axis, damper means included in said torsion mounting means, a velocity transducer including a pair of relatively movable parts one of which is mounted on said support, spring absorber means mounting the other of said parts of said transducer on said support in association with said first part to respond to relative movement of said parts about said second axis, and torquer means associated with said first and second parts of said transducer to dampen certain relative movement between said parts, said transducer producing a signal output in proportion to input turning movement supplied to said base about an axis perpendicular to said first and second axes.

2. An inertial rate sensing apparatus comprising a mass, a support for said mass, torsion spring means mounting said mass on said support means for oscillatory movement relative thereto about a first axis to provide a high natural frequency of oscillation, a base member, driving means mounted in part on said base member for imparting oscillatory movement to said mass relative to said support, torsion means mounting said support on said base member for oscillatory movement about a second axis normal to said first axis to provide a natural frequency of oscillation substantially lower than that of said mass, damper means included in said torsion mounting means to dampen movements of said support in the range of natural frequency of oscillation of said mass, a velocity transducer including a pair of relatively movable parts one of which is mounted on said support, spring absorber means mounting the other of said parts of said transducer on said support in association with said first part to respond to relative movement of said parts about said second axis, and torquer means associated with said first and second parts of said transducer to dampen certain relative movement between said parts, said transducer producing a signal output in proportion to input turning movement supplied to said base about an axis perpendicular to said first and second axes.

3. An inertial rate sensing apparatus comprising, a mass, a support for said mass, torsion spring means mounting said mass on said support means for oscillatory movement relative thereto about a first axis to provide a high natural frequency of oscillation, a base member, driving means mounted in part on said base member for imparting oscillatory movement to said mass relative to said support, torsion means mounting said support on said base member for oscillatory movement about a second axis normal to said first axis to provide a natural frequency of oscillation substantially lower than that of said mass, damper means included in said torsion mounting means to dampen movements of said support in the range of natural frequency of oscillation of said mass, an electromagnetic velocity transducer including a pair of relatively movable parts one of which is mounted on said support, spring absorber means mounting the other of said parts of said transducer on said support in association with said first part to respond to gyroscopic torques about said second axis, and damper means associated with said first and second parts of said transducer to dampen certain relative movement between said parts, said transducer producing a signal output in proportion to input turning movement supplied to said base about an axis perpendicular to said first and second axes.

4. On inertial rate sensing apparatus comprising, a mass, a support for said mass, torsion means mounting said mass on said support for oscillatory movement relative thereto through a frictionless type bearing and defining a first axis of movement, a base member, driving means mounted in part on said mass and in part on said base member for imparting oscillatory movement to said mass relative to said support, quadrilever reed spring means mounting said support on said base for oscillatory movement relative thereto about a second axis normal to said first axis, damper means included in said reed spring mounting means, a velocity transducer including a pair of relatively movable parts one of which is mounted on said support, spring absorber means mounting the other of said parts of said transducer on said support in association with said first part to respond to relative movement of said parts about said second axis, and torquer means associated with said first and second parts of said transducer to dampen certain relative movements between said parts, said transducer producing a signal output in proportion to input turning movement supplied to said base about an axis perpendicular to said first and second axes.

5. An inertial rate sensing apparatus comprising, a mass, a support for said mass, torsion means mounting said mass on said support for oscillatory movement relative thereto and defining a first axis of movement, a base member, driving means mounted in part on said mass for imparting oscillatory movement to said mass relative to said support, leaf spring means mounting said support on said base for oscillatory movement relative thereto about a second axis normal to said first axis, damper means connected to said support, means for damping movement of said support means relative to said base member about said second axis, a velocity transducer including a pair of relatively movable parts one of which is mounted on said support, spring absorber means mounting the other of said parts of said transducer on said support in association with said first part to respond to relative movement of said parts about said second axis, and torquer means associated with said first and second parts of said transducer to dampen certain relative movements between said parts, said transducer producing a signal output in proportion to input turning movement supplied to said base about an axis perpendicular to said first and second axes.

6. An inertial rate sensing apparatus comprising, a mass, a support for said mass, torsion means mounting said mass on said support for oscillatory movement relative thereto and defining a first axis of movement, a base member, driving means mounted in part on said mass and in part on said support for imparting oscillatory movement to said mass relative to said support, crossed reed spring means mounting said support on said base for oscillatory movement relative thereto about a second axis normal to said first axis, a friction damper mounted between said support and said crossed reed spring means at one extremity of said support, a velocity transducer including a pair of relatively movable parts one of which is mounted on said support, spring absorber means mounting the other of said parts of said transducer on said support in association with said first part to respond to relative movement of said parts about said second axis, and torquer means associated with said first and second parts of said transducer to dampen certain relative movements between said parts, said transducer producing a signal output in proportion ot input turning movement supplied to said base about an axis perpendicular to said first and second axes.

7. An inertial rate sensing apparatus comprising, a mass, a support for said mass, torsion spring means mounting said mass on said support means for oscillatory movement relative thereto about a first axis to provide a high natural frequency of oscillation, a base member, driving means mounted in part on said base member and in part on said mass for imparting oscillatory movement to said mass relative to said support, torsion means mounting said support on said axis normal to said first axis to provide a natural frequency of oscillation substantially lower than that of said mass, damper means connected to said support to dampen movements of said support in the range of natural frequency of oscillation of said mass, an electromagnetic velocity transducer including a pair of relatively movable parts one of which is mounted on said support, spring absorber means mounting the other of said parts of said transducer on said support in association with said first part to respond to relative movement of said parts about said second axis, damper means associated with said first and second parts of said transducer to dampen certain relative movement between said parts, said transducer producing a signal output in proportion to input turning movement supplied to said base about an axis perpendicular to said first and second axes, transducer means mounted in part on said support and responsive to oscillation of said mass to produce a signal in synchronization therewith, and means connecting said transducer means to said velocity transducer including a demodulator to produce a direct current signal output whose polarity varies with the direction of turning rate applied to said base about the third axis perpendicular to said first and second axes and whose magnitude varies with the magnitude of said turning rate about said third axis.

8. An inertial rate sensing apparatus comprising, a mass, a support for said mass, torsion spring means mounting said mass on said support means for oscillatory movement relative thereto about a first axis, a base member, driving means mounted in part on said base member and in part on said mass for imparting oscillatory movement to said mass relative to said support, torsion means mounting said support on said base for oscillatory movement relative thereto about a second axis normal to said first axis, damper means included in said torsion mounting means, a velocity transducer including a pair of relatively movable parts one of which is mounted on said support, spring absorber means mounting the other of said parts of said transducer on said support in association with said first part to respond to relative movement of said parts about said second axis, torquer means associated with said first and second parts of said transducer to dampen certain relative movements between said parts, said transducer producing a signal output in proportion to input turning movement supplied to said base about an axis perpendicular to said first and second axes, transducer means mounted in part on said support and responsive to oscillation of said mass to produce a signal in synchronism therewith, and means connecting said transducer means to said velocity transducer including a demodulator to produce a direct current signal output whose polarity varies with the direction of turning rate applied to said base about the third axis perpendicular to said first and second axes and whose magnitude varies with the magnitude of said turning rate about said third axis.

9. An inertial rate sensing apparatus comprising, a mass, a support for said mass, torsion means mounting said mass on said support for oscillatory movement relative thereto about a first axis, a base member, driving means mounted in part on said mass for imparting oscillatory movement to said mass relative to said support, reed spring means mounting said support on said base for oscillatory movement relative thereto about a second axis normal to said first axis, damping means connected to said support for damping oscillations of the same coinciding with the resonant frequency of the support and mass with its mounting and the reed spring means mounting the support, a velocity transducer including a pair of relatively movable parts one of which is mounted on said support, spring absorber means mounting the other of said parts of said transducer on said support in association with said first part to respond to relative movement of said parts about said second axis, and torquer means associated with said first and second parts of said transducer to dampen certain relative movements between said parts, said transducer producing a signal output in proportion to input turning movement supplied to said base about an axis perpendicular to said first and second axes.

10. An inertial rate sensing apparatus comprising: a mass; a support for said mass; means including resilient means pivotally connecting said mass to said support for limited oscillatory rotation relative thereto about only a first axis, said pivotal connection means being arranged so that said first axis passes substantially through the center of mass of said mass; a base member; resilient means mounting said support on said base for oscillatory movement relative thereto about only a second axis normal to said first axis; means adapted to oscillate said mass relative to said support about said first axis at a first frequency; and transducer means including a member resiliently connected to said support and tuned to have a resonant frequency substantially the same as said first frequency, said transducer means being responsive to movement of said support relative to said base.

11. Apparatus of the class described in claim 10 and further including means for damping said member resiliently connected to said support.

12. Apparatus of the class described in claim 10 and further comprising said mass having a relatively high natural frequency of oscillation and said support having a natural frequency of oscillation substantially lower than said natural frequency of oscillation of said mass.

13. Apparatus of the class described in claim 11 and further comprising said mass having a relatively high natural frequency of oscillation and said support having a natural frequency of oscillation substantially lower than said natural frequency of oscillation of said mass.

14. Apparatus of the class described in claim 10 further characterized by including means for damping oscillatory movement of said support relative to said base about said second axis.

References Cited in the file of this patent

UNITED STATES PATENTS

| 2,455,939 | Meredith | Dec. 14, 1948 |
| 2,514,250 | Meredith | July 4, 1950 |
| 2,672,054 | Warren et al. | Mar. 16, 1954 |
| 2,797,580 | Taylor | July 2, 1957 |
| 2,851,886 | Kuipers | Sept. 16, 1958 |
| 2,865,205 | Lear et al. | Dec. 23, 1958 |

FOREIGN PATENTS

| 611,011 | Great Britain | Oct. 25, 1948 |
| 611,021 | Great Britain | Oct. 25, 1948 |